US011228866B1

(12) United States Patent
Skory et al.

(10) Patent No.: US 11,228,866 B1
(45) Date of Patent: Jan. 18, 2022

(54) IDENTIFICATION OF LOCATION-TRACKED AUDIENCES

(71) Applicant: Mobile Technology Corporation, Centennial, CO (US)

(72) Inventors: Stephen Skory, Boulder, CO (US); Michael Perri, Centennial, CO (US); Dale Hartzell, Boulder, CO (US); Nicholas Connor, Renfrew, PA (US)

(73) Assignee: Mobile Technology Corporation, Centennial, CO (US)

( * ) Notice: Subject to any disclaimer, the term of this patent is extended or adjusted under 35 U.S.C. 154(b) by 0 days.

(21) Appl. No.: 16/928,947

(22) Filed: Jul. 14, 2020

(51) Int. Cl.
*H04W 36/22* (2009.01)
*H04W 4/029* (2018.01)
*H04L 29/08* (2006.01)
*G06F 16/9535* (2019.01)
*H04W 64/00* (2009.01)

(52) U.S. Cl.
CPC ........ *H04W 4/029* (2018.02); *G06F 16/9535* (2019.01); *H04L 67/22* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 2016/0269497 A1* | 9/2016 | Glommen | H04L 67/306 |
| 2017/0353941 A1* | 12/2017 | D'Alberto | H04W 64/006 |
| 2018/0114243 A1* | 4/2018 | Huang | G06Q 30/0255 |
| 2019/0335033 A1* | 10/2019 | Huang | G06Q 10/30 |
| 2020/0320550 A1* | 10/2020 | Reichert | G06Q 30/0201 |
| 2020/0344658 A1* | 10/2020 | Huang | H04W 36/0083 |
| 2021/0174395 A1* | 6/2021 | Khan | G06F 16/29 |

* cited by examiner

*Primary Examiner* — Natisha D Cox
(74) *Attorney, Agent, or Firm* — Perkins Coie LLP; Brian Kinnear; Colin Fowler

(57) ABSTRACT

Disclosed herein identifies audiences of mobile devices that behave a like a seed group of devices. That is, the behave alike group are those devices that move in similar patterns and visit the similar locations with a similar frequency as the devices of the seed group. Similarity is based on correlative similarity in having visited matching categories of location styles identified via mapping data (e.g., devices that visit national parks at a similar frequency). Correlative similarity is performed using a machine learning model trained via a follow the regularized leader proximal.

22 Claims, 8 Drawing Sheets

IDENTIFICATION OF LOCATION-TRACKED AUDIENCES

INCORPORATION BY REFERENCE

This application relates to U.S. patent application Ser. No. 16/583,185 entitled "SYSTEMS AND METHODS FOR USING SPATIAL AND TEMPORAL ANALYSIS TO ASSOCIATE DATA SOURCES WITH MOBILE DEVICES" filed on Sep. 25, 2019, and incorporated by reference herein.

TECHNICAL FIELD

Various embodiments of the present technology generally relate to data delivery. More specifically, some embodiments of the present technology relate to systems and methods for using spatial and temporal analysis to associate data sources with mobile devices.

BACKGROUND

The mobile devices that people carry with them everywhere records a notable amount of information about the respective users. That information often includes who the user is and where the user has been (often via GPS coordinates or base station location identification coordinates). Audience identification is where one set of people are compared against a larger set to find those whom are similar in the larger set. The methods for performing audience identification vary in computational complexity and effectiveness.

DETAILED DESCRIPTION

Figure 1:
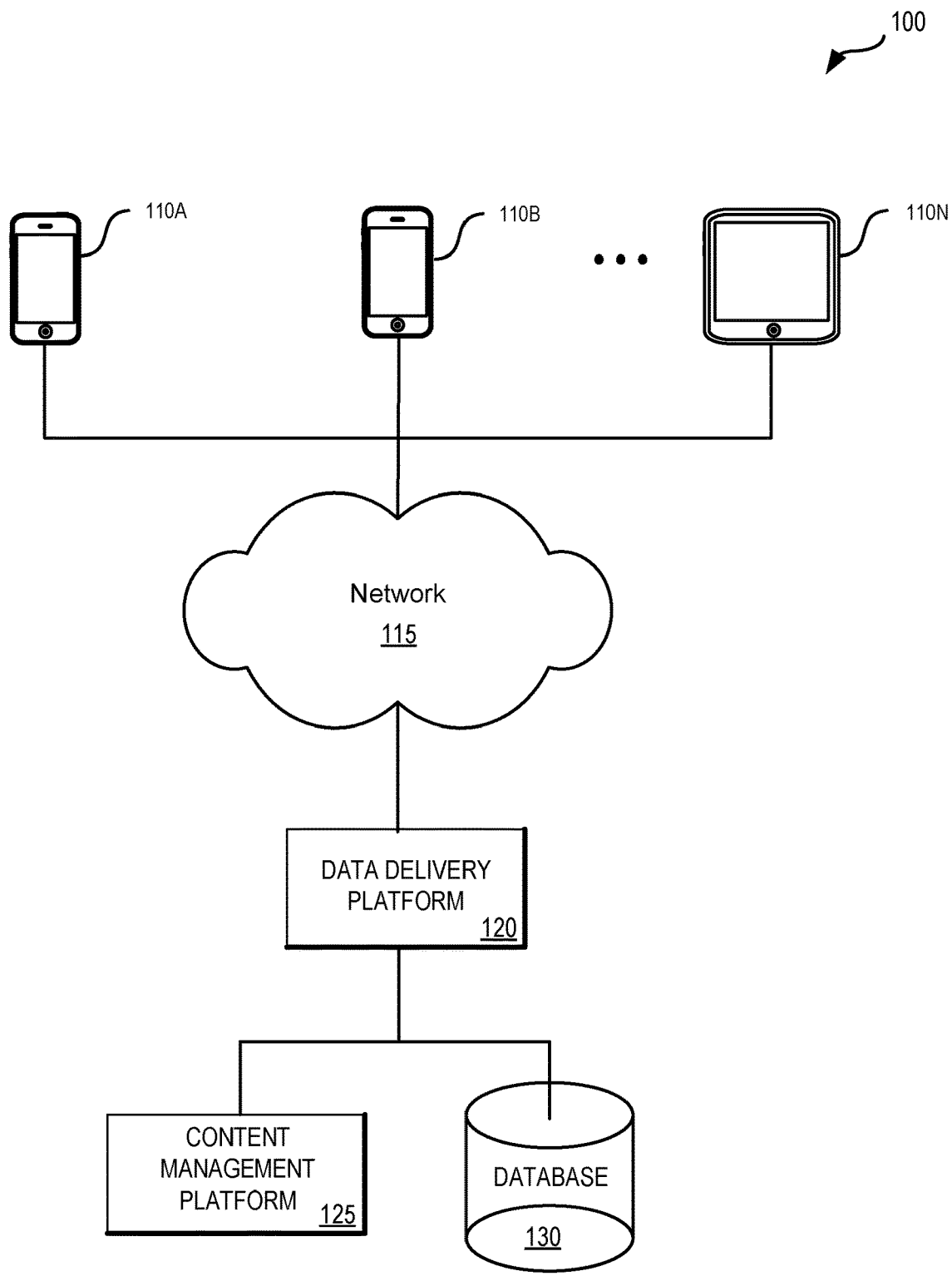
FIG. 1 illustrates an example of a networked-based environment in which some embodiments of the present technology may be utilized.

Various embodiments of the present technology generally relate to data delivery. More specifically, some embodiments of the present technology relate to systems and methods for using spatial and temporal analysis to associate data sources with mobile devices. Some embodiments enable the delivery of data to support a wide variety of services for and about mobile devices that are based on data stored in corporate, commercial, and government databases, which is not currently linked to individual mobile devices accurately. Socio-economic data is assigned to each mobile device in the dataset population. One application of this technology is to allow advertisers to better target their ads to relevant target audiences with greater accuracy.

It is useful to link the mobile device to an individual or household so that the data from existing databases, which are typically keyed by name and address, can be used to provide enhanced services to the users of mobile devices and expand services for advertisers, businesses, and government leveraging location data from mobile devices. Locational data from mobile devices is generally collected by onboard GPS sensors and/or network triangulation techniques that identify the location of the mobile device at particular intervals or in response to activity with the device (e.g., using an application that reports location).

A substantial amount of data on each individual and household is stored in corporate, retailer, government, and marketing databases. This data can include any type of data collected today—demographic data, psychographic data, behavioral data, purchase data, interest data, crime data, occupation data, registration data, survey data, medical data, and more. This data can be used for a variety of purposes that include advertising, marketing, location studies, public safety, healthcare, and more. There are also many technologies for capturing location data from mobile devices and building historical location profiles associated with a device.

One of the leading trends in marketing is social-based marketing through the use of social networks with the intent of reaching like-minded consumers based on their common social interests and affiliations. Unfortunately, the ability to reach these audiences is controlled by a few large social networking companies that dictate the way that advertisers can reach and interact with these consumers. Mobile devices provide tremendous reach for advertisers and being able to reach social networks and interest groups independent of these large social networking companies provides new ways to advertise and interact with these consumers. It is especially powerful if these social networks and interest groups can be linked to the commercial and marketing data associated with these consumers, allowing richer analytics to be performed on these groups and enabling predictive modeling to find similar types of customers.

In addition to identifying social network connections as a marketing tool, identifying like-minded consumers based on demographic traits and behaviors, such as prior purchase behavior, browsing behavior, and what types of places a user visits are an effective strategy. That is, once a marketing professional finds a first consumer who fits some set of idealized parameters, finding other consumers who are similar should be evaluated via the commonality of purpose in the sorts of locations that the first consumer visits as compared to the other consumers. This is often referred to as "lookalike modeling".

The technology uses location data records from mobile ad networks, mobile applications, and hundreds of networks with sensors located in malls, airports, transportation terminals, hotels, offices, medical offices, elevators, etc. This location data can be used to build location profiles that can be linked to addresses that had been visited through a series of analytical processes. The location profiles then provide a map of where the user of the device had been, along with a purpose of each of those locations (e.g., whether each location was a restaurant, a gas station, a residential address, a car dealership, a yarn store, etc. . . . ).

Once a mobile device is associated with a set of addresses that had been visited, and the purposes of those locations, the overall dataset of the population may be filtered into a smaller group based on search queries (e.g., all those of the population who had visited yarn stores). The smaller group is a "seed group."

Based on the search query, the identified devices of the seed group may be compared to the population or subset of the population for correlative similarity in all aspects of the device profile (e.g., the purposes of the locations visited, how many times visited, how recently visited, social network connections, common interests, associations, and social dynamics, how well socioeconomic data matches, etc.). Correlative similarity identifies behave-alike audiences that are similar to those of the seed group. Those that are correlatively similar to the seed group act as useful analogs for the original seed group.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled", and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

General Description

FIG. 1 is a block diagram of network-based environment 100 in accordance with one or more embodiments of the present technology. As illustrated in FIG. 1, user devices 110A-110N may use network 115 to submit and retrieve information from data delivery platform 120. User devices 110A-110N can interact with data delivery platform 120 through an application programming interface (API) that runs on the native operating system of the device, such as IOS® or ANDROID™. Through data delivery platform 120, mobile device users can be targeted for the delivery of customized data by data delivery platform 120 using, for example, spatial and temporal analysis to associate data sources with mobile devices. Content management platform 125 enables the delivery of data stored in database 130 to support a wide variety of services for and about mobile devices that are based on data stored in corporate, commercial, and government databases, which are not currently linked to individual mobile devices accurately.

For example, data delivery platform 120 can use location data records from websites, mobile ad networks, mobile applications, and hundreds of networks with sensors located in malls, airports, transportation terminals, hotels, offices, medical offices, elevators, etc. This location data can be used to build location profiles that can be linked to addresses that had visited through a series of analytical processes. Using this information, a customized profile can be built around the mobile device while keeping the user's personal information anonymous.

A location profile includes a purpose for that location. The purpose of a location can be determined from multiple data sources regarding what is present at the location. For example, public or private mapping software references businesses that are open at a given address. Additionally, performing general Internet searches via an automatic web crawler on a given address provides an indication of what is present at a given address. In some embodiments, multiple sources can be compared for differential evaluation of what is present at a given address.

Once the system identifies what is present at a given address, that content is associated with a one or more purpose flags. The purpose flags indicate the purpose of the content at the address. For example, if the device visits an address that is associated with the law firm Perkins Coie LLP, the purpose of that building is "a law firm" or "to render legal services." Similarly, if visits a yarn store, the purpose flags identify the particular store as a "yarn store" and other purpose flags identify the particular store more broadly as an "arts and crafts store." A given location may have multiple purposes associated therewith. For each address listed, the system associates all relevant purpose flags for that address as having been visited by the mobile device. The purpose flags are used in other processes as search query filters.

User devices 110A-110N can be any computing device capable of receiving user input as well as transmitting and/or receiving data via the network 115. In one embodiment, user devices 110A-110N can be any device having computer functionality, such as a personal digital assistant (PDA), mobile telephone, smartphone, wearable computing device (e.g., eyewear, watches, etc.), tablet, or similar device. User devices 110A-110N can be configured to communicate via network 115, which may comprise any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, 5G, CDMA, digital subscriber line (DSL), etc.

Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

The various components illustrated in FIG. 1 can be coupled to network 115 using various types of network communication mechanisms. These network communication mechanisms may communicate with other electronic devices by transmitting and receiving wireless signals using licensed, semi-licensed or unlicensed spectrum over network 115. In some cases, network 115 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 115 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network, or other communications networks.

Figure 2:
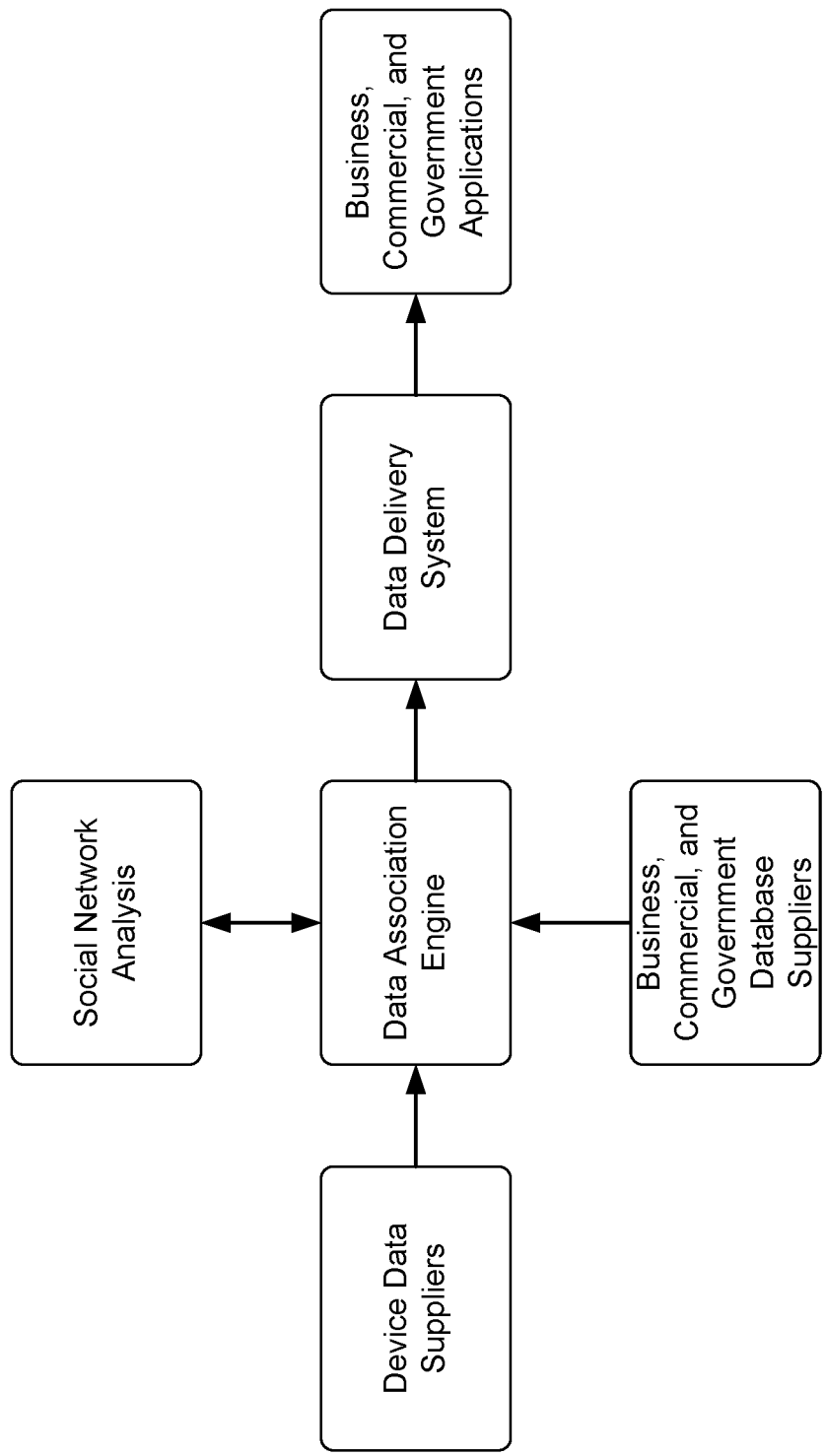
FIG. 2 illustrates various components and interactions in accordance with one or more embodiments of the present technology.

FIG. 2 illustrates various components and interactions in accordance with one or more embodiments of the present technology. The system may associate the data in business, commercial, and government databases with mobile device data that comes from a variety of suppliers that include mobile ad networks, mobile carriers, mobile applications, businesses, Wi-Fi networks, and any other viable source. The components illustrated in FIG. 2 provide some examples of the means for perform various operations described.

In some cases, the system collects mobile device data. This mobile device data may include event data such as, but not limited to the following: mobile network call data, mobile data network registration and usage, mobile device location data, mobile device browsing and web data, transaction data, mobile application data, social media data, purchase data, login data, device sensor data, credit card data, etc. The mobile device event data can include one or more the following fields: 1) a device identifier, such as UDID, MAC address, cookie, or any other permanent or semi-permanent identifier; 2) location information, typically in latitude and longitude or addresses; and/or 3) a timestamp that includes date and time, in minutes and seconds. Note that not all data has to contain a timestamp to provide basic matching. A timestamp may be used, in some embodiments, to cross-match data sources with different device identifiers.

The mobile device event data can be clustered by location, device identifiers, and time of day. These clusters are then evaluated against household address data. This address data is then used to link the mobile device ID with the other databases. As part of this process, the system anonymizes the data to provide enhance security for the gathered and linked data and ensure that Personally Identifiable Information (PII) is not disclosed to anyone. As part of the process, anonymous IDs can be created so that PII is never disclosed when the data is used by the customer applications.

Figure 3:
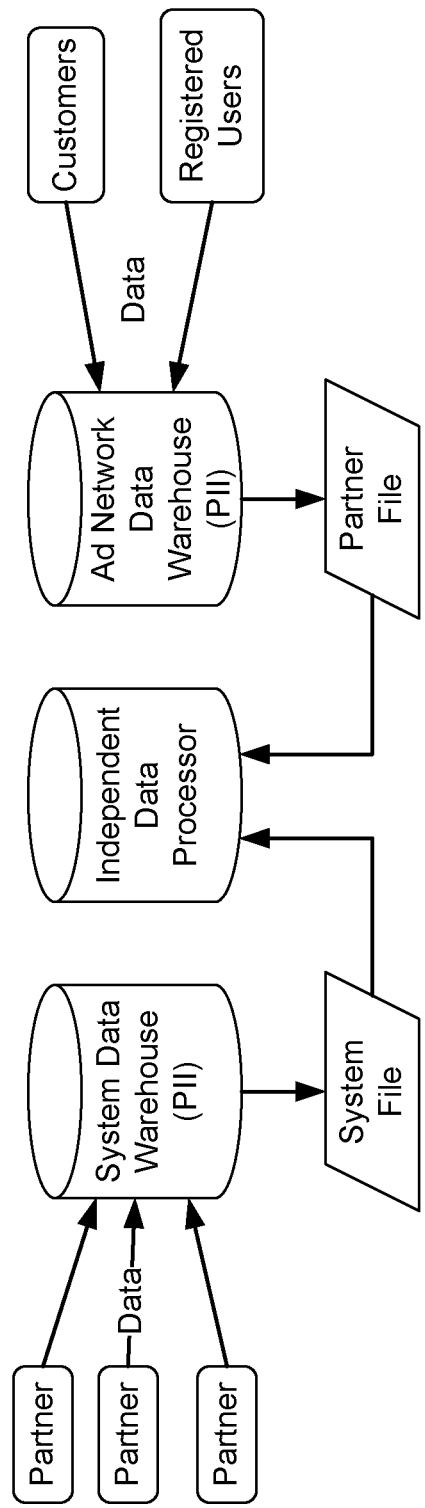
FIG. 3 is a block diagram illustrating various data and partner components in accordance with various embodiments of the present technology.

FIG. 3 is a block diagram which illustrates the use of an independent data processor to match the output data from the system to the data provided by ad network partners. Because PII is used in the matching process, the independent data process is used to prevent either the system or the ad network partner from accessing the PII. The output result from the data processor is the linked data that matches from both data sources.

As illustrated in FIG. 3, the system can collect raw mobile device data and commercial, corporate, and governmental data on individuals from a variety of partners. This data can be processed by the system in FIG. 2 and used to create a System Data Warehouse that contains PII as a key. The system can output the data warehouse into a system file that can be transmitted to other parties, including Independent Data Processors.

Similarly, Partners such as Ad networks also collect customer information from customers of partner services (applications, websites, etc.) as well as registered users of these partner services, which can similarly be accumulated into the Ad Network Data Warehouse. The Ad Network Data Warehouse can also use the PII as a key. The Ad Network Data Warehouse can also be output as a Partner File for transmission to Independent Data Processors.

The Independent Data Processor takes the System File and Partner File and compares the PII keys. The Independent Data Processor creates an output file that contains combined records from the System File and the Partner File only for records with matching PII keys from both files. In some embodiments, if a record with a PII key is unique to only one of the files, it is not included in the output. The merged file is then transmitted to the Ad Network Partner for use. In various embodiments, the system can ensure that no PII data is shared with either the System or the Ad Network Partner for individuals that are not already known to them.

Figure 4:
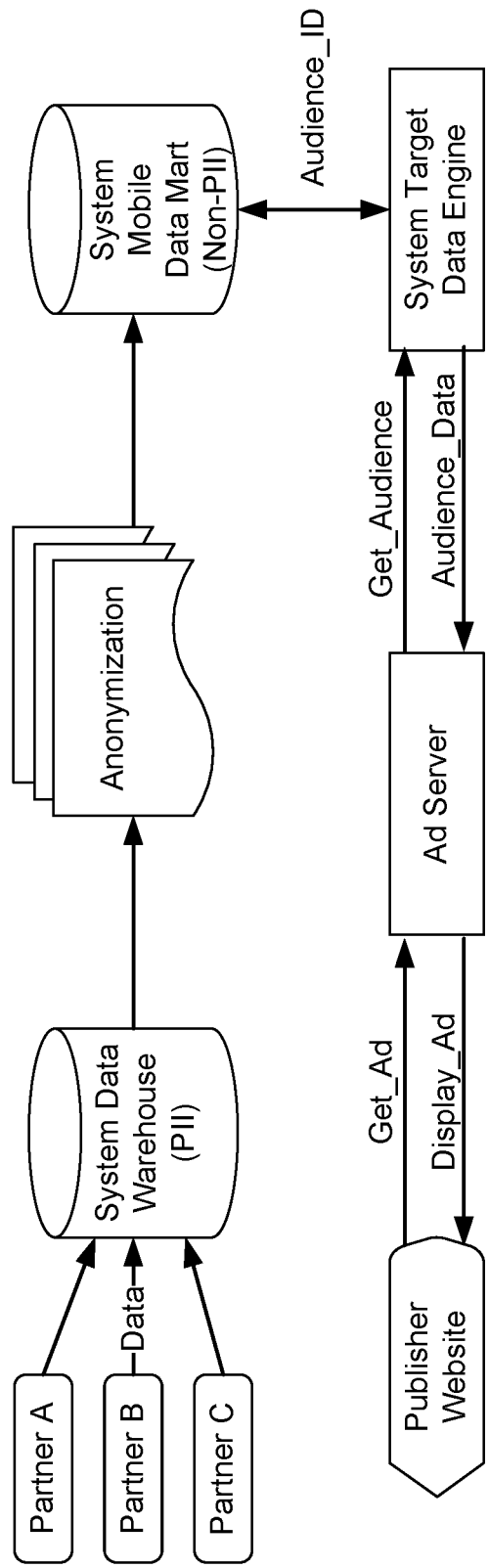

FIG. 4 is a block diagram illustrating the use of anonymized requests by Ad Network Partners to retrieve data from the system in accordance with some embodiments of the present technology. One advantage of using anonymized requests is that this eliminates the need to expose PII while providing real-time access to the system output.

As illustrated in FIG. 4, the system collects raw mobile device data and commercial, corporate, and governmental data on individuals from a variety of partners. This data is processed by the system in FIG. 2 and used to create a System Data Warehouse that Is keyed to mobile ad ID and/or household address. The system then processes the System Data Warehouse through an anonymization process that removes or modifies the PII with data that cannot be directly linked to the PII. One way of doing this is some sort of one-way hashing algorithm so that data cannot be converted back to the original PII by anyone, but other methods that include matching tables used internally to the System to map PII to non-PII data could be used but are far less secure since the matching tables themselves are potentially vulnerable. The anonymized data can be stored, for example, in a real-time accessible System Mobile Data Mart.

When a Publisher Website (or mobile app) makes a request to a Partner Ad Server, the Ad Server in turn makes a request to the System Target Data Engine which provides an external interface to the System Mobile Data Mart. The System Target Data Engine takes the anonymous key passed in by the Ad Server and looks up the data in the System Mobile Data Mart. The data returned by the System Mobile Data Mart is transmitted to the Ad Server, which in turn uses the data to make decisions on what Ad to return to the Publisher.

Figure 5:
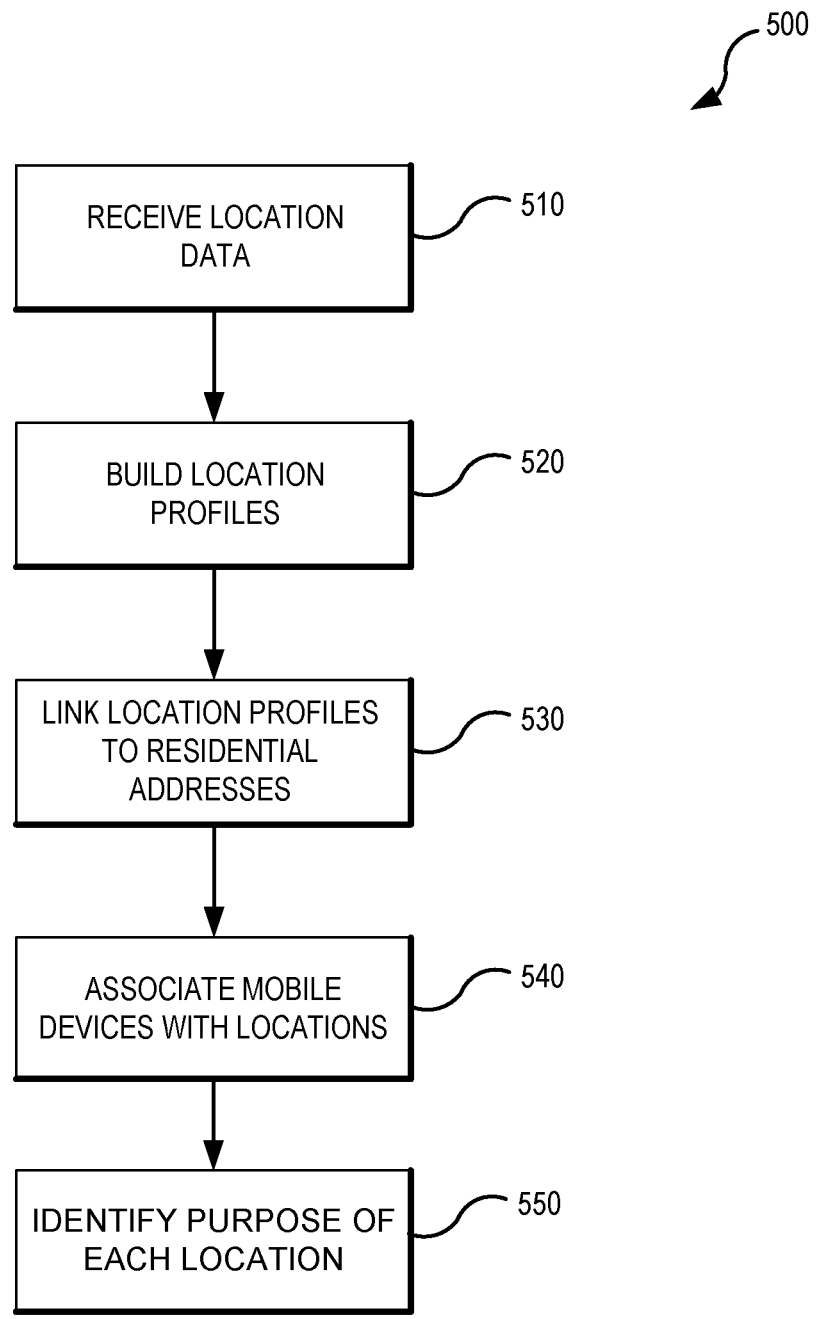
FIG. 5 is a flowchart illustrating an exemplary set of operations for associating mobile devices with addresses in accordance with one or more embodiments of the present technology.

FIG. 5 is a flowchart illustrating an exemplary set of operations for associating mobile devices with addresses in accordance with one or more embodiments of the present technology. The operations illustrated in FIG. 5 may be performed by various means including, but not limited to, data analysis platform 120, content management platform 125, database 130, one or more servers, one or more processors, networks and networking hardware, various modules or engines (e.g., a receiving module, a profiling module, a linking module, an association module, etc.), and/or one or more computing systems.

As illustrated in FIG. 5, location data can be received from one or more sources during receiving operation 510. Using this information, the building operation 520 can build location profiles that can be linked to specific addresses that had been visited during linking operation 530. Association operation 540 can then use this information to develop a behavior profile for the device as having visited a particular address. Identity operation 550 then evaluates a purpose for each address visited. The purpose refers to what sort of building/business exists at a given address. In the case of a business, the sorts of services offered at the building are categorized.

For example, if the device visits an address that is associated with the law firm Perkins Coie LLP, the purpose of that building is "a law firm" or "to render legal services." Similarly, if visits a McDonalds, the purpose might be "restaurant" or "fast food." A given location may have multiple purposes associated therewith. For each address listed, the system associates all relevant purpose flags for that address as having been visited by the mobile device. The purpose flags are used in other processes as search query filters.

Behave-Alike Audiences

A process that takes a seed audience and finds a look-alike audience with similar or better propensity towards equivalent advertiser campaigns. An advertiser can use an existing seed audience that is known or assumed to have good performance and increase their spending capability by extending or complimenting it with a lookalike audience.

Fundamental to the process is a scoring function which computes the probability that two devices are similar, where probability 1 is very similar and probability 0 is not similar at all. The probability is described by a simple function:

$$P(similar|device_1, device_2)$$

Traditionally, lookalike modeling has taken the form of demographic attribute similarity. For example, attributes were primarily demographic around income, place of residence, age, etc. . . . . Past behavioral attributes pertained to browsing and/or purchases. Or alternatively, given a seed audience where 60% of the members are short and 40% are tall. That data is compared to a larger set or database of new members and for each member if its owner is short, the new audience includes it 40% of the time, and if tall, includes it 60% of the time. Thus, the lookalike audience has the same characteristics of the seed audience.

However, the goal at the outset is to generate an audience that has similar or better performance to equivalent campaigns. A lookalike audience might work in the context of a campaign that sells certain clothing or shoe sizes, but the attribute of being short or tall certainly isn't a good indicator of performance on all advertising campaigns. That is not to say that height profiles or other physical attributes are not useful data, but that there are additional aspects to evaluate.

Thus, the problem is approached differently and instead one seeks "behave-alike" audiences that perform or act similarly to the seed audience overall. The basis of this approach is substituting the probability function above with a supervised machine learning model on top of a catalog of datasets.

Figure 6:
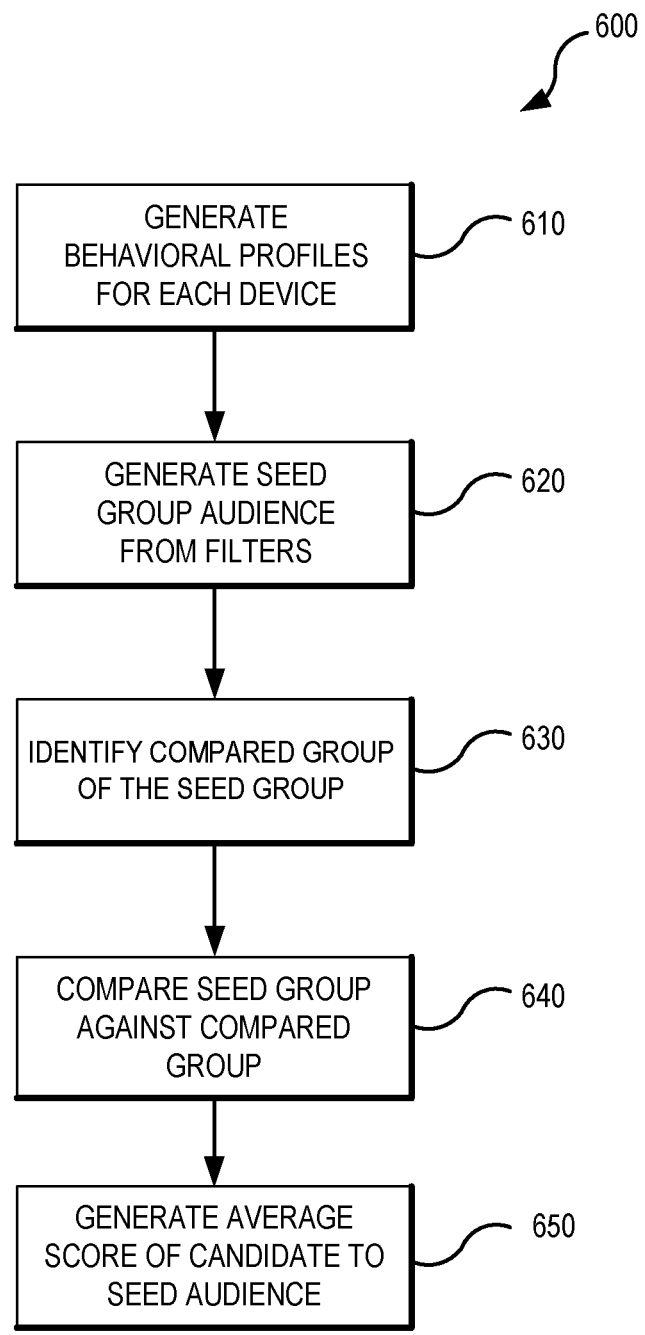
FIG. 6 is a flowchart illustrating identification of a behave-alike audience

FIG. 6 is a flowchart illustrating identification of a behave-alike audience. In step 610, the system generates behavioral profiles for the mobile devices within the population. The device behavior profiles include location data of the population of mobile devices over a time period on multiple occasions, the location data including a plurality of coordinates attributed to addresses visited by each respective mobile device of the population of mobile devices as well as demographic and marketing data concerning the respective users of the devices. Data collected about a given mobile device includes any of:

Demographic data on the mobile device user, e.g., whether the user is married, what the user's household income is, what the user's networth is, where the user's workplace location is, where the user's household location is, what workplace category the user is associated with, and whether the user has a workplace chain identifier;

Response to marketing campaign data on the mobile device user, e.g., whether the given user had responded to marketing materials in the past, and how that response was embodied, including, for example, where a given user had received marketing material for a given ad campaign and was converted into a sale, an appearance at a designated location, or a click-through in a web campaign ("conversion of marketing campaign filter"); and Spatial-temporal data on the mobile device user, e.g., the last seen date for the user, whether the user had visited distinct commercial locations, whether the user had visited distinct commercial chains, whether the user had visited distinct commercial categories, whether the user had visited distinct locational categories (a locational purpose), and the count of visits in each of the other mentioned categories.

In addition to the collection of the above data, the above data is all each collectively associated with a given device. Prior lookalike models do not associate location visitation to household demographic data. The collective association including spatial-temporal data is not available in prior lookalike models that only relied on online browsing or purchase behavior and had to have a digital transaction or actual purchase linked via credit card transaction or store loyalty DB to track the transaction. This model captures the data even if no purchase transaction or online digital transaction happens.

In step 620 the system generates a seed group based on user-defined parameters using the generated device behavior profiles. The seed group is defined as a subset of an overall population of mobile device from which that is data. Each of the collected data for a given device may be used as a filter to identify a seed group. There may be any number of search filters used to identify the seed group from the total population. In some embodiments, the filters used to generate the seed group pertain to the locational purpose of the locations visited by the mobile device.

For example, one search filter may be defined as "all devices that have visited any a public park in the last month." A more refined version of that same search may be defined as "all devices that have visited any a neighborhood children's playground in the last month." This sample search may be, for example, executed because an audiobook retailer believes the sort of people who hang around watching their children play are the ideal customers for audiobooks.

In another example, a search filter may be defined as "all devices in the Boston metro area, with owners in the 35-45 age group, that have visited a car dealership in the last month."

In step 630, the system identifies a larger group to compare the seed group against (a "compared population"). The definition of the larger group is based on the relative computing power the system has available. Given no restrictions on computing power, the seed group is compared against the entire remaining population of devices.

Given some restrictions on computing power, the comparison is made against a reduced group that may be limited by any combination of the filters used to define the seed group, and additionally a filter relating to degrees of direct connection to members of the seed group. Degrees of connection may be measure by social networks or via locational social networks (e.g., those described in U.S. application Ser. No. 16/583,185 entitled "SYSTEMS AND METHODS FOR USING SPATIAL AND TEMPORAL ANALYSIS TO ASSOCIATE DATA SOURCES WITH MOBILE DEVICES" filed on Sep. 25, 2019 and incorporated by reference herein).

An example of restrictions may include all first and second order social connections to the seed audience are considered candidates for the behave-alike audience. For example, the model pairs each behave-alike audience candidate with 500 devices from the seed group and annotates each pair using the process under device pair features. In some embodiments, the behave-alike audience candidate is compared against those 500 seed group devices. In this embodiment, each candidate would have a resultant 500 correlative similarity scores from the following step, 640.

In step 640, the seed group is compared against the compared population. The comparison is performed on a pairwise basis. Each member of the seed group as compared to each member of the compared population or a predetermined subset of the compared population (e.g., a subset of the compared population may be only those social connections of the given seed group device). Each pairwise comparison is given a score on a basis of correlative similarity (e.g., from 0-1). A match is determined based on a predetermined threshold of correlative similarity (e.g., a minimum score from 0-1). Comparison attributes include but are not limited to any combination of:

Intersection and difference of commercial categories visited;
Intersection and difference of commercial chains visited;
Intersection and difference of distinct locational categories visited;
Counts of above options;
Count intersection and difference of commercial locations visited;
Distance between devices' households;
Distance between devices' chosen locations; and
Difference between devices' count of visits.

Each of the above comparison attributes may include a predetermined weighting that differs. In some embodiments, the pair-wise comparison data is transformed further using tricks to optimize for a machine learning model. For example, attributes may include feature hashing in order to vectorize the features.

Hash tables may be embedded. An embedding is a relatively low-dimensional space into which you can translate high-dimensional vectors. Embeddings make it easier to do machine learning on large inputs like sparse vectors representing words. Ideally, an embedding captures some of the semantics of the input by placing semantically similar inputs close together in the embedding space. An embedding can be learned and reused across models. E.g., for one pair of devices, the Intersection of commercial categories visited could be length 5, or for another pair just length 1.

The attributes may be organized via data binning to numerical fields or ranges and identified via one-hot encoding and stored using spare matrices/arrays. In some embodiments, the above optimizations result in approximately 7,000 data points per device pair to compare.

The result of the comparison for correlative similarity reveals a subset of devices from the compared population that have at least the threshold of correlative similarity with at least one device from the seed group. The resulting subset are those devices that behaved similarly to the seed group.

In step 650, the scores for each candidate are averaged to generate an average similarity of candidate to seed audience score. Given the average similarity, the model applies a decision threshold on whether or not to include it in the output lookalike audience. For example, if the decision threshold is 0.10, then any candidate with an average similarity score of 0.10 or higher would be included in the behave-alike audience, while all candidates with a lower score would not.

An approximate description of the resultant subset of devices is that, these are devices that visit the same types of locations and at a correlatively similar frequency. For example, where the initial filter to identify the seed group was "devices who have visited yarn stores," it may be that the resultant seed group tends to visit various categories of hobbyist locations, thus the behave-alike subset for the "yarn store visitors" seed group may be those devices that ultimately frequent hobby stores of various types.

The above example is a simplified version that refers only to similarity with respect to locational categories. In some embodiments, the new resultant subset are devices that each have enough similarities across all the various comparisons to be correlatively similar to the seed audience. It is a hybrid of visits to similar locational categories, or demographics, or geographic closeness, and the interplay between them, where each of these factors can be selectively turned off or deemphasized. For example, if the seed audience originates from a yarn store near a large retirement community, the demographic skew of the patrons will affect the extended audience.

Where the seed audience was the retirement community-adjacent yarn store, and the compared population of devices was all college students in the country, one would presume that very few of the college students would be picked in the resultant subset because of the demographic dissimilarity. However, if the compared population of devices was other retirement community residents, the match rate would be higher. The match rate of the first example would not be 0%, and the second example would not be 100%, which sets this method apart from other methods that are narrower with respect to the use of demographics to build the audience extension.

The resultant identified audience, with behave-alike devices, generally have similar or greater propensity towards campaigns. Advertisers can use this process to augment their campaign spend and increase their reach while still achieving KPIs for example in click-through rate (CTR) and conversion rate. Early tests of the process have shown a 23% increase in CTR with behave-alike audience vs seed audience.

Machine Learning Model

Figure 7:
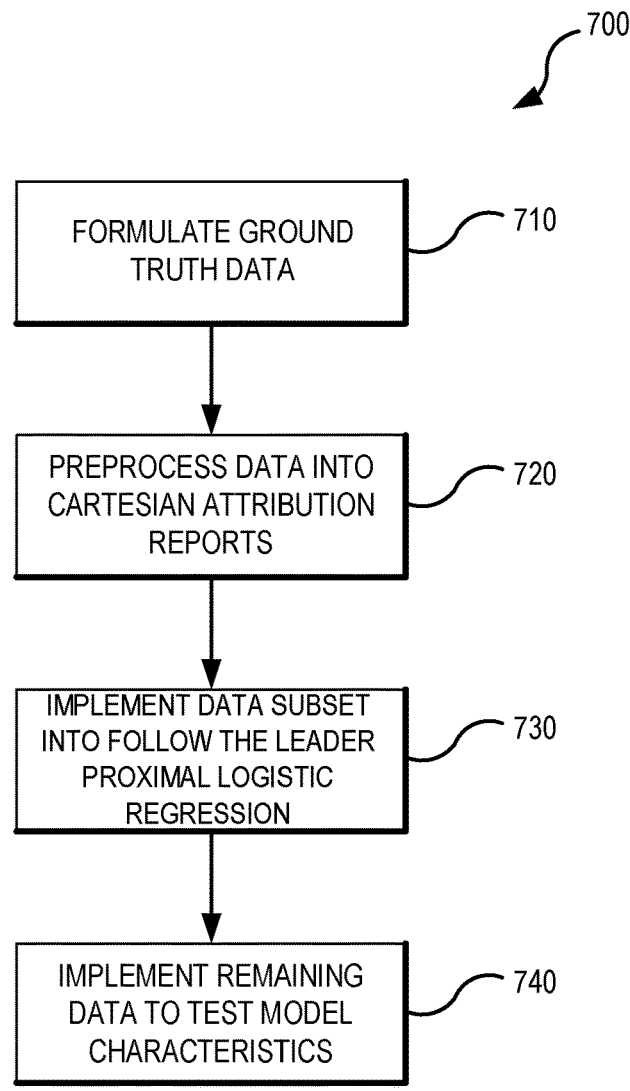
FIG. 7 is a flowchart illustrating a method of training a machine learning model to identify behave alike audiences

FIG. 7 is a flowchart illustrating a method of training a machine learning model to identify behave alike audiences. In step 710, a training administrator formulates a ground truth dataset to train and evaluate the machine learning model. The ground truth dataset is sourced from hand-selected attribution reports. Each attribution report has a device ID and a boolean flag indicating whether that device converted on a given advertiser's campaign. That is, an advertiser provides material to either the mobile device or that device's primary user/owner and the Boolean indicated whether the device/user made a purchase, appeared in a specified location, clicked through a page, etc. . . . .

In step 720, model preprocessing takes a full cartesian product of the attribution report so that each device ID is compared with all other device IDs. If both devices converted on the campaign, the model is trained with a label for the pair as being highly similar (1). If one device converted and the other did not, the model is trained with a label the pair as being highly dissimilar (0). An example trained model includes an attribution-derived dataset of about 48 million samples. All samples are run through the device pair feature process described above.

In step 730, a large subset of the data (e.g., 80%) is used to train a Follow the Regularized Leader Proximal (FTRL) logistic regression model to act as the similarity function (see Follow-the-Regularized-Leader and Mirror Descent: Equivalence Theorems and L1 Regularization by H. Brendan McMahan). The training process uses the ground-truth dataset to iteratively make predictions about the similarity of each pair and then implementing a correction to the extent the model was wrong.

In step 740, the remaining subset (e.g., 20%) of the data is reserved to test various characteristics of a model classifier. For example, how accurate the classifier is, the sensitivity, error, etc. The feedback from the characteristic evaluation is used in a cycle to iteratively create a better and better model. FTRL's trained parameters are saved so that the parameters can be loaded and used at a later time.

Exemplary Computer System Overview

Figure 8:
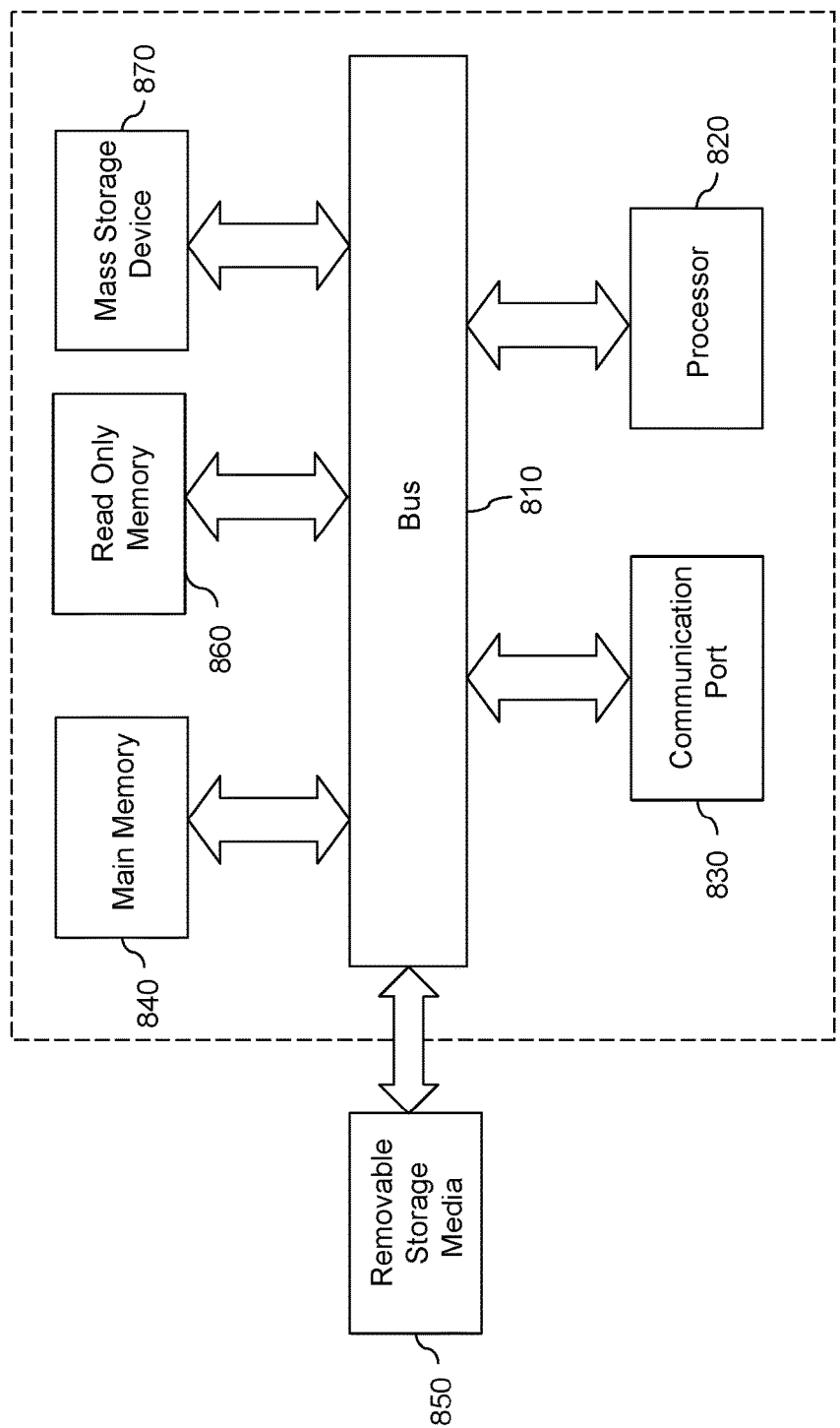
FIG. 8 illustrates an example of a computer system with which some embodiments of the present technology may be utilized.

Embodiments of the present technology include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present technology may be utilized. Computer system 800 is an example of a means for implementing the functionality and performing several of the operations described above. According to the present example, the computer system includes a bus 810, at least one processor 820, at least one communication port 830, a main memory 840, a removable storage media 850, a read only memory 860, and a mass storage 870.

Processor(s) 820 can be any known processor, such as, but not limited to, Intel® lines of processors; AMD® lines of processors; ARM® lines of processors; or Qualcomm® lines of processors. Communication port(s) 830 can be any of an RS-232 port for use with a modem-based dialup connection, a 60/100 Ethernet port, or a Gigabit port using copper or fiber. Communication port(s) 830 may be chosen depending on a network such as a Local Area Network (LAN), Wide Area Network (WAN), or any network to which the computer system 800 connects.

Main memory 840 can be Random Access Memory (RAM) or any other dynamic storage device(s) commonly known in the art. Read only memory 860 can be any static storage device(s) such as Programmable Read Only Memory (PROM) chips for storing static information, such as instructions for processor 820.

Mass storage 870 can be used to store information and instructions. For example, hard disks such as the Adaptec® family of SCSI drives, an optical disc, an array of disks, such as the Adaptec family of RAID drives, or any other mass storage devices may be used.

Bus 810 communicatively couples processor(s) 820 with the other memory, storage and communication blocks. Bus 810 can be a PCI/PCI-X or SCSI based system bus depending on the storage devices used.

Removable storage media 850 can be any kind of external hard-drives, floppy drives, solid state storage drives, cloud storage systems, IOMEGA® Zip Drives, Compact Disc—Read Only Memory (CD-ROM), Compact Disc—Re-Writable (CD-RW), and/or Digital Video Disk—Read Only Memory (DVD-ROM).

The components described above are meant to exemplify some types of possibilities. In no way should the aforementioned examples limit the scope of the technology, as they are only exemplary embodiments.

Embodiments of the present technology may be implemented using a combination of one or more modules or engines. For example, embodiments provide for a graphical user interface generation module to generate one or more graphical user interface screens to convey results/information and take instructions, a general-purpose or special-purpose "communications module" for interfacing with various components and databases, a "data gathering module" to collect information from various sources, an "anonymization module" to anonymize data, a "rating module" to rate the quality of a residential match, a "linking module" to link an address to a mobile device, a "social graph module" to group devices based on one or more spatial and temporal analyses, a "reporting module" to generate device and location reports, as well as other modules and engines for providing various functionality needed by embodiments of the present technology. Still yet, various embodiments may incorporate two or more of these modules into a single module and/or associate a portion of the functionality of one or more of these modules with a different module. Each of these modules and engines provides examples of the means for implementing functionality and performing operations described herein.

Various modifications and additions can be made to the embodiments discussed without departing from the scope of the present technology. For example, while the embodiments described above refer to particular features, the scope of this technology also includes embodiments having different combinations of features, and embodiments that do not include all of the described features. Accordingly, the scope of the present technology is intended to embrace all such alternatives, modifications, and variations and all equivalents thereof.

The invention claimed is:

1. A method of identifying users of mobile devices of a population that are similar to a seed group of users of mobile devices, comprising:
   generating device behavior profiles associated with a population of mobile devices, wherein the device behavior profiles include location data of the population of mobile devices over a time period on multiple occasions, the location data including a plurality of coordinates attributed to addresses visited by each respective mobile device of the population of mobile devices;
   assigning the addresses visited by each respective mobile device into categories based on a purpose of structures at each given address; and
   identifying a subset of the population of mobile devices that are correlatively similar to a seed group of mobile devices based on a relationship to the categories assigned to locations visited by each respective device.

2. The method of claim 1, further comprising:
   generating the seed group from the behavior profiles of the population of mobile devices based on a search query, wherein the query is based on a filterable attribute of device behavior profiles.

3. The method of claim 2, wherein filterable attributes include any of:
   whether the device owner is married;
   flagged interests of the device owner from a social media profile;
   registered political party of the device owner;
   the household income of income the device owner;
   the economic net worth of the device owner;
   the workplace location of the device owner;
   the household location of the device owner;
   the category of the device owner's workplace;
   the device's last seen date of location data;
   categories of locations visited by the device;
   distinct commercial businesses visited by the device; or
   the number of visits to any particular location by the device.

4. The method of claim 1, wherein the relationship is based on having visited matching categories of locations.

5. The method of claim 4, wherein the relationship is further based on having visited matching sub-categories of locations.

6. The method of claim 4, wherein the relationship is further based on recency of visits to matching categories of locations.

7. The method of claim 4, wherein the relationship is further based on a number of visits to matching categories of locations.

8. The method of claim 1, wherein the relationship is based on having visited a same exact location.

9. The method of claim 1, wherein correlative similarity is further based on matching demographic characteristics between the device behavior profiles of the population of mobile devices and the seed group of mobile devices.

10. The method of claim 1, where the correlative similarity of the seed group is compared against a filtered subset of the population of mobile devices, the filtered subset of the population of mobile devices is based on any combination of:
    geographic filters applied to the population of mobile devices;
    social network relationship to the seed group filter applied to the population of mobile devices;
    socioeconomic filters applied to the population of mobile devices;
    recency of location data filter applied to the population of mobile devices; or
    conversion of marketing campaign filter applied to the population of mobile devices.

11. A system of identifying users of mobile devices of a population that behave similarly to a seed group of users of mobile devices, comprising:
    a memory including a plurality of device behavior profiles associated with a population of mobile devices, wherein the device behavior profiles include location data of the population of mobile devices over a time period on multiple occasions, the location data including a plurality of coordinates attributed to addresses visited by each respective mobile device of the population of mobile devices, wherein the plurality of device behavior profiles include assignment of the addresses visited by each respective mobile device into categories based on a purpose of structures at each given address; and
    a trained machine learning model that identifies a subset of the population of mobile devices that are correlatively similar to a seed group of mobile devices based on a relationship to the categories assigned to locations visited by each respective device.

12. The system of claim 11, further including:
    a processor enabled search engine that is configured to generate the seed group from the behavior profiles of the population of mobile devices based on a search query, wherein the query is based on a filterable attribute of device behavior profiles.

13. The system of claim 12, wherein filterable attributes include any of:
    whether the device owner is married;
    the household income of income the device owner;
    the economic net worth of the device owner;
    the workplace location of the device owner;
    the household location of the device owner;
    the category of the device owner's workplace;
    the device's last seen date of location data;
    categories of locations visited by the device;
    distinct commercial businesses visited by the device; or
    the number of visits to any particular location by the device.

14. The system of claim 11, wherein the relationship is based on having visited matching categories of locations.

15. The system of claim 14, wherein the relationship is further based on having visited matching sub-categories of locations.

16. The system of claim 14, wherein the relationship is further based on recency of visits to matching categories of locations.

17. The system of claim 14, wherein the relationship is further based on a number of visits to matching categories of locations.

18. The system of claim 11, wherein the relationship is based on having visited a same exact location.

19. A computer-readable storage medium storing instructions that, when executed by a computing system, cause the computing system to perform a process comprising:
generating device behavior profiles associated with a population of mobile devices, wherein the device behavior profiles include location data of the population of mobile devices over a time period on multiple occasions, the location data including a plurality of coordinates attributed to addresses visited by each respective mobile device of the population of mobile devices;
assigning the addresses visited by each respective mobile device into categories based on a purpose of structures at each given address; and
identifying a subset of the population of mobile devices that are correlatively similar to a seed group of mobile devices based on a relationship to the categories assigned to locations visited by each respective device.

20. The computer-readable storage medium of claim 19, further comprising:
generating the seed group from the behavior profiles of the population of mobile devices based on a search query, wherein the query is based on a filterable attribute of device behavior profiles.

21. The computer-readable storage medium of claim 19, wherein correlative similarity is further based on matching demographic characteristics between the device behavior profiles of the population of mobile devices and the seed group of mobile devices.

22. The computer-readable storage medium of claim 19, where the correlative similarity of the seed group is compared against a filtered subset of the population of mobile devices, the filtered subset of the population of mobile devices is based on any combination of:
geographic filters applied to the population of mobile devices;
social network relationship to the seed group filter applied to the population of mobile devices;
socioeconomic filters applied to the population of mobile devices;
recency of location data filter applied to the population of mobile devices; or
conversion of marketing campaign filter applied to the population of mobile devices.

* * * * *